Figure 5:
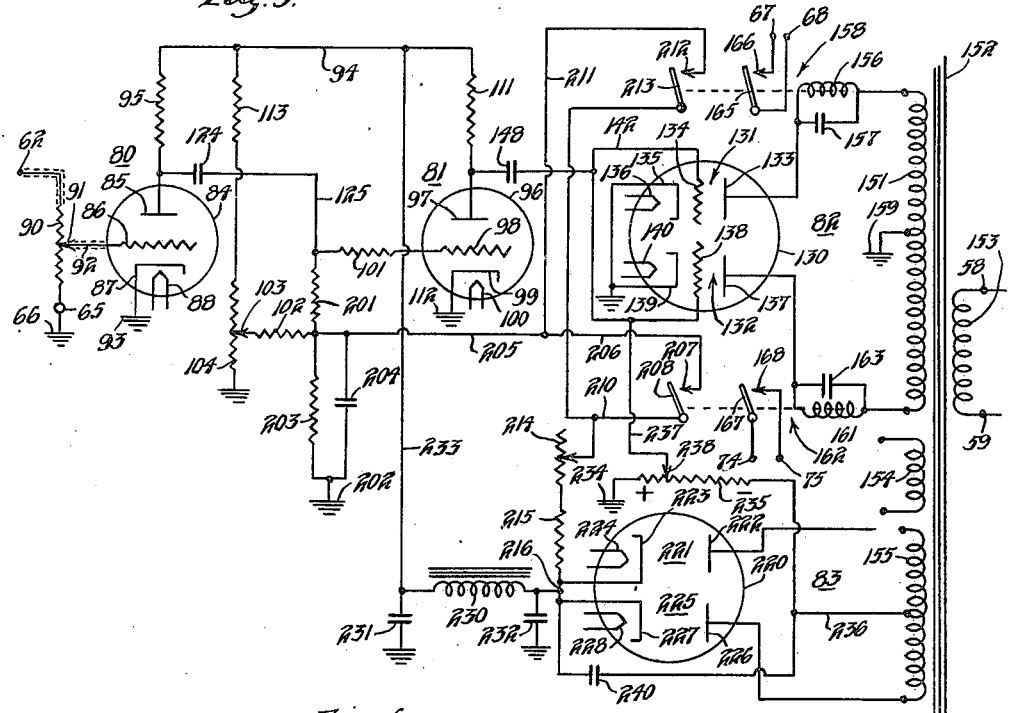

Aug. 19, 1947.  W. H. GILLE ET AL  2,425,733
ELECTRONIC CONTROL APPARATUS FOR POSITIONED DEVICE
Filed Nov. 18, 1942  3 Sheets-Sheet 1
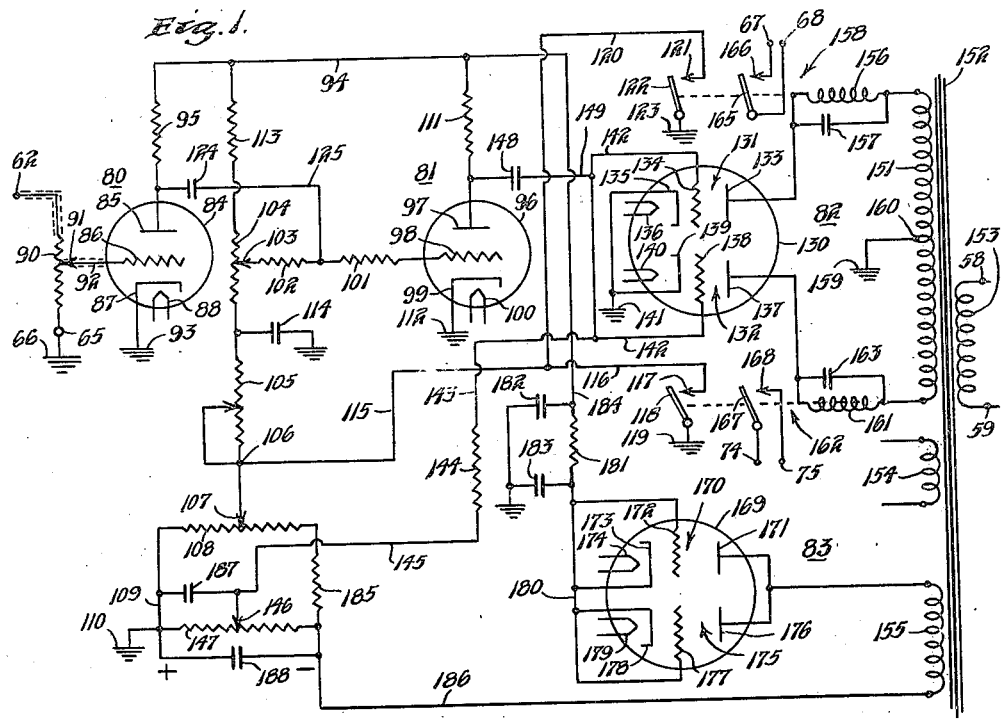
Inventors
WILLIS H. GILLE
ALBERT P. UPTON
WILLIAM J. FIELD
By George N. Fisher
Attorney Aug. 19, 1947.  W. H. GILLE ET AL  2,425,733
ELECTRONIC CONTROL APPARATUS FOR POSITIONED DEVICE
Filed Nov. 18, 1942  3 Sheets-Sheet 2
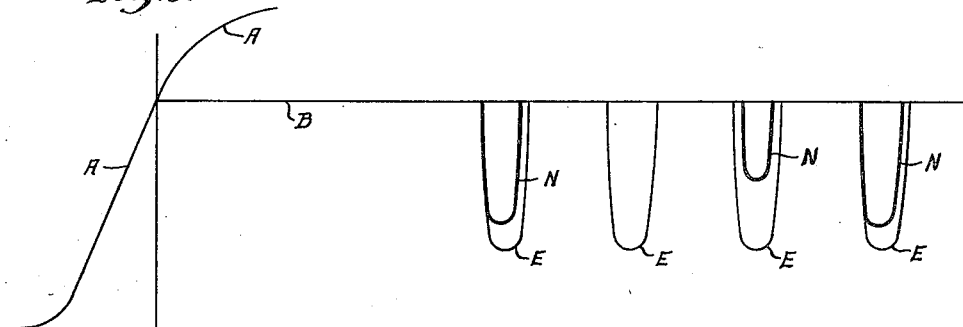
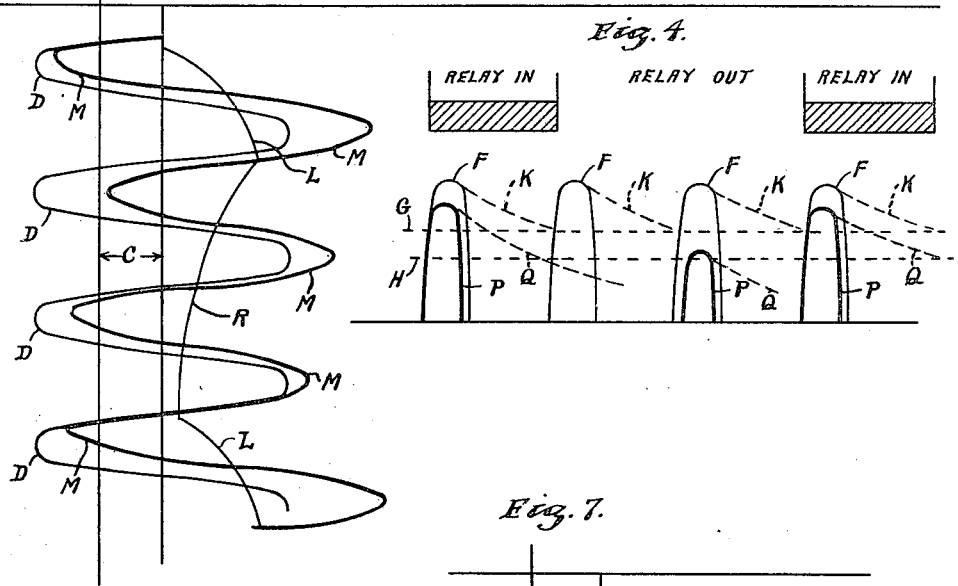
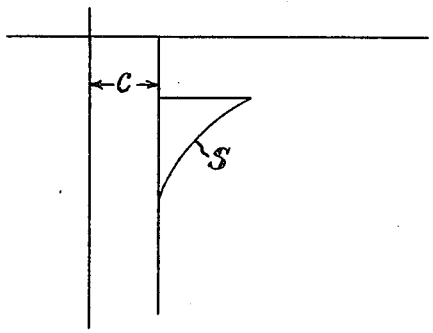
Inventors
WILLIS H. GILLE.
ALBERT P. UPTON.
WILLIAM J. FIELD.
George N. Fisher
Attorney Inventors
WILLIS H. GILLE.
ALBERT P. UPTON.
WILLIAM J. FIELD.
George N. Fisher
Attorney Patented Aug. 19, 1947

2,425,733

UNITED STATES PATENT OFFICE 2,425,733

ELECTRONIC CONTROL APPARATUS FOR POSITIONED DEVICE

Willis H. Gille, St. Paul, and William J. Field and Albert P. Upton, Minneapolis, Minn., assignors to Minneapolis-Honeywell Regulator Company, Minneapolis, Minn., a corporation of Delaware Application November 18, 1942, Serial No. 466,008

27 Claims. (Cl. 74—388)

1

This invention relates to electronic amplifiers, and particularly to amplifiers adapted for use in control systems of the type wherein a device is controlled in accordance with an electrical signal produced by means responsive to a controlling condition.

An object of the invention is to provide an improved control system responsive to a variable condition, wherein a load device is operated either intermittently or continuously, depending on the magnitude of said condition. Another object is to provide, in such a system, means for establishing the limit of a first range of values of said condition wherein said load device is not operated, means for establishing the limit of a second range of values of said condition wherein said load device is operated intermittently, and means for independently varying said limits.

Another object of the invention is to provide, in a normally balanced control system of the type described, improved means for preventing "hunting" of the system. A further object is to prevent hunting of the system by increasing the sensitivity of the system when the controlling condition is changing rapidly.

Another object of the present invention is to provide an improved amplifier circuit for use in an electrical control system wherein it is desired to operate a load device either intermittently for periods of varying lengths or continuously, dependent upon the magnitude of an electrical signal.

Another object of the present invention is to provide an improved amplifier circuit for use in motor control system of the type shown in the co-pending application of Willis H. Gille, Serial No. 447,989, filed June 22, 1942.

A further object of the present invention is to provide an improved amplifier circuit for controlling the operation of a relay in accordance with a variable condition. A still further object is to provide, in such an amplifier, a circuit operated by the relay and effective to decrease the sensitivity of the amplifier so as to cause intermittent operation of the relay.

Figure 6:
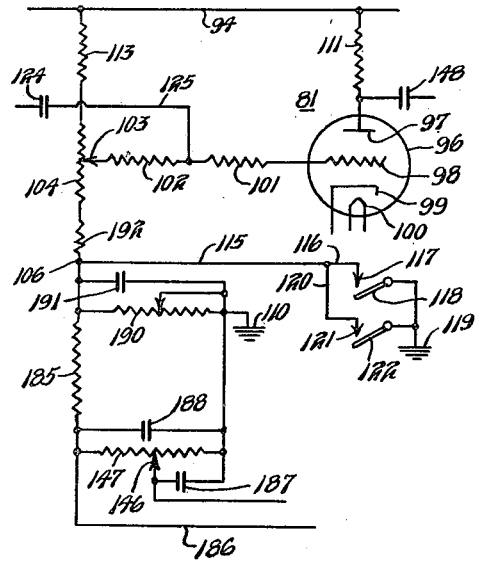

Other objects and advantages of our invention will become apparent from a consideration of the appended specification, claims and drawing, in which:

Figure 1 is an electrical wiring diagram of an amplifier circuit embodying the principles of our invention, Figure 2 is a somewhat diagrammatic representation of a control system wherein the amplifier circuit of Figure 1 may advantageously be used, Figure 3 is a graphical representation of the operation of the amplifier circuit of Figure 1, Figure 4 is a graphical representation of the operation of a different portion of the amplifier circuit of Figure 1, Figure 5 is an electrical wiring diagram of a modified form of amplifier circuit embodying the principles of our invention, Figure 6 is an electrical wiring diagram illustrating a modification of a portion of the amplifier circuit of Figure 1, and Figure 7 is a graphical representation of the operation of the amplifier circuit of Figure 6.

Figures 1 and 2

Referring now to Figure 2, there is shown a system for controlling the movements of the rudder of an aircraft in accordance with the deflection of a directional gyroscope, diagrammatically indicated at 10, from a normal position. The gyroscope 10 is indicated as rotating a shaft 11 whenever the aircraft on which the gyroscope is mounted changes its direction. Fixed on the shaft 11 is a slider 12, which cooperates with a slidewire resistance 13. The slider 12 and the resistance 13 together form a control potentiometer 14.

The resistance 13 is connected in an electrical network 15, of the Wheatstone bridge type. The network 15 also includes a slidewire resistance 16, with which is associated a slider 17. The resistance 16 and slider 17 together form a follow-up potentiometer 18. The network 15 is supplied with electrical energy from a transformer secondary winding 15a, whose terminals 20 and 21 are connected through conductors 22 and 23, respectively, to the left and right terminals of resistances 13 and 16. The sliders 12 and 17 form the output terminals of the network 15.

The slider 17 is fixed on a shaft 24 for rotation therewith. The shaft 24 also carries a pulley 25 and a gear 26. A cable 27 runs over the pulley 25. This cable 27 may be the conventional control cable used in aircraft for positioning the rudder.

The gear 26 engages a pair of gears 30 and 31, which are fixed on shafts 32 and 33, respectively. The shaft 32 is connectable, through an electrically operable clutch device schematically indicated at 34, to a driving shaft 35. Similarly, the shaft 33 is connectable by an electrically operable clutch device schematically indicated at 36 to a driving shaft 37. The shafts 35 and 37 carry gears 38 and 39, respectively, which mate with each other so that the shafts 35 and 37 rotate in opposite directions. The gear 38 operatively engages a gear 41 which is driven by a continuously running motor 42.

The motor 42 may be supplied with electrical energy from any suitable source, as for example a battery 43. An energizing circuit for motor 42 may be traced from the upper terminal of battery 43 through conductors 44 and 45, motor 42, a conductor 46, ground connections 47 and 48, and a conductor 49 to the lower terminal of battery 43.

The battery 43 also supplies electrical energy to a converter 51, which may be of any conventional type, and serves to supply alternating electrical energy to an amplifier 52, which is disclosed in detail in Figure 1. The direct current input circuit for converter 51 may be traced from the upper terminal of battery 43 through conductors 44 and 53, converter 51, a conductor 54, ground connections 55 and 48, and conductor 49 to the lower terminal of battery 43. The converter 51 supplies alternating electrical energy through conductors 56 and 57 to power input terminals 58 and 59 of amplifier 52.

The slider 12 is connected through a shielded conductor 61 to an input terminal 62 of amplifier 52. The slider 17, which serves as the other output terminal of network 15, is connected through a conductor 63 to ground at 64. The other input terminal 65 of amplifier 52 is grounded as at 66.

As explained in greater detail hereinafter in connection with the description of Figure 1, the amplifier 52 selectively controls the conductivity of energizing circuits for the electrically operated clutches 34 and 36. The energizing circuit for clutch 34 may be traced from the upper terminal of battery 43 through a conductor 60, a terminal 67 of amplifier 52, a contact 166 (see Figure 1), a switch arm 165, a terminal 68, a conductor 69, clutch 34, a conductor 70, ground connections 71 and 48, and conductor 49 to the lower terminal of battery 43. The energizing circuit for clutch 36 may be traced from the upper terminal of battery 43 through a conductor 73, a terminal 74 of amplifier 52, switch arm 167 (see Fig. 1), a contact 168, a terminal 75, a conductor 76, clutch 36, a conductor 77, ground connections 78 and 48, and conductor 49 to the lower terminal of battery 43.

Suitable switch means may be provided for shutting down the entire system when not in use. Also, limit switch means may be provided for selectively preventing energization of one or the other of the clutches when the follow-up potentiometer, or its load, reaches the end of its range of travel. Suitable switching arrangements for both of these purposes are shown, for example, in the Gille application, Serial No. 447,989, dated June 22, 1942, previously mentioned.

Referring to Figure 1, there are shown the details of the amplifier circuit 52. This amplifier comprises a first preliminary voltage amplification stage 80, a second preliminary voltage amplification stage 81, and a final power amplification stage 82. The amplifier 52 also includes a rectifier circuit 83 for supplying power to the preliminary stages 80 and 81 and to provide suitable biasing potentials for the second stage 81 and the final stage 82.

The first amplification stage 80 includes an electric discharge device, shown as a triode 84, which may be, for example, one-half of a twin triode of the type known commercially as type 7F7. The triode 84 includes an anode 85, a control electrode 86, a cathode 87, and a heater filament 88.

A resistance 90 is connected across the input terminals 62 and 65 of amplifier 52, so that any signal potential appearing between those terminals causes a corresponding current flow through resistance 90. The resistance 90 is provided with an adjustable tap 91 which serves in a well known manner to control the gain of the amplifier 52.

The input circuit of amplifier stage 80 may be traced from control electrode 86 through a shielded conductor 92, tap 91, a portion of resistance 90, terminal 65, and ground connections 66 and 93 to cathode 87. The output circuit of stage 80 may be traced from a conductor 94, which serves as the positive terminal of the output circuit power supply, through a load resistance 95, anode 85, and cathode 87 to ground at 93, the ground connection serving as the negative terminal of the output circuit power supply.

The second amplifier stage 81 includes a triode 96 having an anode 97, a control electrode 98, a cathode 99, and a heater filament 100. The triodes 84 and 96 may be, for example, the two halves of a single 7F7 twin triode. The input circuit of the stage 81 may be traced from control electrode 98 through resistances 101 and 102, a tap 103, the lower portion of a resistance 104, a variable resistance 105, a terminal 106, a tap 107, the left portion of a resistance 108, a conductor 109, and ground connections 110 and 112 to cathode 99. A resistance 113 is connected between positive power supply terminal 94 and the upper terminal of resistance 104. This connection applies a positive bias potential to this input circuit. The magnitude of this positive bias potential is determined by the setting of tap 103 along resistance 104. The resistance 108 is so connected to the rectifier circuit 83 that its grounded left terminal is positive with respect to its right terminal. The tap 107 therefore is negative with respect to ground, and the negative potential between tap 107 and ground opposes the positive bias potential previously described. A condenser 114 is connected between the upper terminal of resistance 105 and ground, for a purpose to be more fully described hereinafter. Circuits are provided for connecting the terminal 106 directly to ground, thereby shunting the portion of resistance 108 between tap 107 and its left terminal. These circuits may be traced from terminal 106 through a conductor 115, and thence either through a conductor 116, a contact 117, and a switch arm 118 to ground at 119, or through a conductor 120, a contact 121, and a switch arm 122 to ground at 123. Variations in the potential of anode 85 caused by variations in the output current of the stage 80 are coupled to the input circuit of stage 81 through a blocking condenser 124 and a conductor 125.

The output circuit of stage 81 may be traced from positive supply terminal 94 through load resistance 111, anode 97, and cathode 99 to ground at 112.

The final power amplification stage 82 includes a twin triode 130, which may be of the type commercially known as type 7N7. The twin triode 130 includes two triodes 131 and 132. The triode 131 has an anode 133, a control electrode 134, a cathode 135, and a heater filament 136. The triode 132 includes an anode 137, a control electrode 138, a cathode 139, and a heater filament 140.

The power amplification stage 82 has a common input circuit for both the triodes 131 and 132. This common input circuit may be traced from either control electrode 134 or control electrode 138 through conductors 142 and 143, a resistance 144, a conductor 145, a tap 146, the left hand portion of a resistance 147, and ground connections 110 and 141 to cathodes 135 and 139. Variations in the potential of the anode 97 caused by variations in the output current of the second amplifier stage 81 are transmitted to the common input circuit of the final stage 82 through a blocking condenser 148 and a conductor 149 to conductor 142 in the common input circuit. The resistance 147 is so connected to the rectifier circuit 83 that the tap 146 is negative with respect to ground. The setting of tap 146 with respect to resistance 147 therefore determines a negative bias potential applied to the common input circuit of final stage 82, and hence the normal current flow in the output circuit of that stage.

The output circuit of final stage 82 is divided into two branches, each of which includes one of the triodes 131 and 132. Both branches of the output circuit of stage 82 are supplied with alternating electrical energy from a secondary winding 151 of a transformer 152. The transformer 152 also includes a primary winding 153 and two additional secondary windings 154 and 155.

The upper branch of the output circuit of final stage 82 may be traced from the upper terminal of secondary wiinding 151 through a winding 156 of a relay 158 and a condenser 157 connected in parallel with winding 156, anode 133, cathode 135, and ground connections 141 and 159 to mid-point tap 160 on transformer secondary winding 151. The lower branch of the final stage output circuit may be traced from the lower terminal of secondary winding 151 through a winding 161 of a relay 162 and a condenser 163 in parallel with the winding 161, anode 137, cathode 139, and ground connections 141 and 159 to mid-point tap 160 on winding 151.

From the foregoing, it should be apparent that the two branches of the output circuit of final stage 82 may be conductive on opposite half cycles of the alternating energy supplied by the winding 151. That is, the triode 131 may be conductive during the half cycles when the upper terminal of winding 151 is positive with respect to the center tap 150, while the triode 132 may be conductive during the half cycles when the lower terminal of secondary winding 151 is positive with respect to center tap 160. The secondary winding 154 of transformer 152 is connected through the terminals 20 and 21 to the network 15. Therefore, any signal which appears between the output terminals of network 15 is of the same frequency as the energy supplied to the final output stage 82. In accordance with the well-known characteristics of alternating current bridge circuits, it will be understood that the time phase of such a signal depends upon the direction of unbalance of the network 15. If the phase of the signal is such that the control electrodes 134 and 138 are positive when the upper terminal of secondary winding 151 is positive, the current flow through triode 131 is increased above the normal value determined by the setting of tap 146 on resistance 147, while if the phase of the signal is such that the control electrodes 134 and 138 are positive when the lower terminal of secondary winding 151 is positive, the current flow through the triode 132 is increased.

Condensers 157 and 163 operate to maintain energization of the relay windings 156 and 161, respectively, over a period longer than the half cycles during which the triodes associated with the respective relays are conductive. During the half cycle when the triode is conductive, the triode supplies the current flowing through the relay winding and also charges the condenser. During the half cycle when the triode is non-conductive, the condenser discharges through the relay winding, thereby maintaining the current flow.

Relay 158 includes, in addition to the winding 156, the switch arms 122 and 165, previously mentioned. Both the switch arms 122 and 165 are biased to the circuit opening position and are moved to circuit closing position upon sufficient energization of relay winding 156.

The relay 162 similarly includes, in addition to winding 161, the switch arms 118 and 167, previously mentioned. Both switch arms 118 and 167 are biased to the circuit opening position and are moved to their circuit closing position upon sufficient energization of winding 161.

The rectifier circuit 83 which supplies unidirectional electrical energy to the output circuits of stages 80 and 81 is energized from secondary winding 155 of transformer 152. This rectifier circuit includes a tube which may be a rectifier tube or a twin triode 169, which may be of the type commercially known as type 7F7. The twin triode 169 includes a first triode 170 having an anode 171, a control electrode 172, a cathode 173, and a heater filament 174. The second triode is generally indicated at 175, and includes an anode 176, a control electrode 177, a cathode 178, and a heater filament 179. The rectifier circuit is of the half-wave type. The control electrodes of the triodes are connected directly to their respective cathodes, so that each triode is conductive when a potential of suitable polarity is applied between its anode and cathode. On the half cycles when the upper terminal of secondary winding 155 is positive, current flows therefrom through anode 171 and cathode 173 of triode 170 to a conductor 180, and through the parallel circuit including anode 176 and cathode 178 of triode 175 to conductor 180. The current supplied to the output circuits of stages 80 and 81 passes from conductor 180 through a filter network comprising a resistance 181 and condensers 182 and 183 connected between the opposite terminals of the resistance 181 and ground. After passing through the filter network, the current flows along conductor 184 to conductor 94 which serves as the positive power supply terminal for the output circuits of stages 80 and 81. The various ground connections serve as the negative power supply terminals for these output circuits. The current supplied by the rectifier circuit 83 flows through the various output circuits and ground connections to ground connection 110, through the network formed by resistances 147, 108, and 185, and thence through a conductor 186 to the lower terminal of transformer secondary winding 155. It should be noted that the direction of current flow through resistances 108 and 147 is such as to make their left terminals positive with respect to their right terminals, as indicated by the legend in the drawing. A filter condenser 188 is connected between conductor 186 and ground, and another filter condenser 187 is connected between tap 146 and ground.

The heater filaments 88, 100, 136, 140, 174, and 179 may be connected to any suitable source of electrical energy (not shown).

In order to aid those skilled in the art in constructing an amplifier in accordance with our invention, the following table is appended, giving values of the various resistances and condensers used in one embodiment of our invention:

| Reference Character | Quantity |
| --- | --- |
| 90 | 10,000 ohms. |
| 95 | ¼ megohm. |
| 101 | ½ megohm. |
| 102 | 1 megohm. |
| 104 | ¼ megohm. |
| 105 | .05 megohm. |
| 108 | 0.1 megohm. |
| 111 | ¼ megohm. |
| 113 | 1 megohm. |
| 114 | .05 microfarad. |
| 124 | .05 microfarad. |
| 144 | ½ megohm. |
| 147 | .05 megohm. |
| 148 | .05 microfarad. |
| 157, 163 | 1 microfarad. |
| 181 | 5,000 ohms. |
| 182 | 10 microfarads. |
| 183 | 10 microfarads. |
| 185 | 0.1 megohm. |
| 187 | 12 microfarads. |
| 188 | 12 microfarads. |

*Operation of Figures 1 and 2*

When the sliders 12 and 17 are in the positions shown in Figure 2, the network 15 is balanced and no signal potential is impressed on the input terminals 62 and 65 of amplifier 52. Under these conditions, neither of the relays 158 and 162 is energized, and hence neither of the clutches 34 and 36 is energized. The shaft 24, the follow-up slider 17 and the rudder of the aircraft therefore remain stationary.

In this specification, either of the relay windings 156 or 161, or either of the relays 158 and 162, may be described as energized whenever the current flow through the winding in question is sufficient to move the associated switch arms to, or to hold them in, their attracted positions. The windings or relays may be described as deenergized whenever the current flow is such that the switch arms are in their retracted positions.

If the aircraft deflects from the course which it is desired to maintain, the gyroscope 10 operates the slider 12 across the resistance 13. Let it be assumed that a deflection takes place in a direction such that slider 12 is moved to the left across resistance 13. Slider 12 thereby assumes a potential nearer to that of input terminal 20 than the potential of slider 17 to terminal 20. A signal potential is therefore impressed on the input terminals of amplifier 52, and the phase of this signal is the same as that which would be obtained if bridge input terminal 20 were connected to amplifier input terminal 62, and bridge input terminal 21 were connected to amplifier input terminal 65. Let it be assumed that the amplifier 52 reacts to a signal of this phase by causing energization of winding 156 of relay 158. Energization of winding 156 causes switch arm 165 to engage contact 166, thereby completing the energizing circuit for clutch 34. It may be assumed that motor 42 rotates in such a direction, when clutch 34 is energized, that shaft 24 rotates in a counterclockwise direction, thereby moving slider 17 to the left along resistance 16. As soon as this motion of slider 17 has progressed far enough so that its potential equals that of slider 12, the signal impressed on the input terminals of amplifier 52 is reduced to zero, thereby causing deenergization of clutch 34 and stopping of the shaft 24.

In a similar manner, it may be observed that if the slider 12 moves to the right from the position shown in the drawing, it thereby attains a potential closer to that of bridge input terminal 21 than that of slider 17 to terminal 21. A signal potential is thereby impressed on the input terminals of amplifier 52. The phase of this signal is the same as that which would be obtained if terminal 21 were connected to amplifier input terminal 62 and terminal 20 were connected to amplifier input terminal 65. This signal is therefore of a phase opposite to that obtained under the conditions just discussed. This signal causes the amplifier to energize winding 161 of relay 162, thereby causing switch arm 167 to engage contact 168 and complete the energizing circuit for clutch 36. Energization of clutch 36 causes shaft 24 to be rotated in a direction opposite to that caused by energization of clutch 34. The shaft 24 therefore moves clockwise, driving the slider 17 to the right along resistance 16 in a direction to rebalance the network 15.

If the shaft 24 is rotating too rapidly as the slider 17 approaches the point at which the network 15 will be rebalanced, the slider 17 may overshoot the balance point because of the inertia of the moving parts of the system. If such overshooting occurs, a hunting condition is set up, wherein the slider 17 oscillates back and forth about the balance point. In other words, the slider hunts for the balance point without finding it. In order to prevent the establishment of such hunting conditions, we have provided means for establishing a range of positions extending a short distance on either side of the balance point, wherein the slider 17 may come to rest, even though the bridge circuit 15 may be slightly unbalanced. This range of positions is known as the "dead spot." Means are provided for adjusting the width of this range of position, and this means is referred to as the "dead spot," or sensitivity, adjustment. This "dead spot" is of course effective with respect to either the control slider 12 or the follow-up slider 17. We have also provided means for reducing the tendency of the system to "hunt" by providing for a slower average rate of operation of shaft 24 when the unbalance of network 15 is small than when the unbalance is large. In our system, if the control slider 12 moves beyond the "dead spot," the amplifier circuit causes intermittent energization of one of the clutches 34 and 36. After the slider 12 has passed through a second range of positions, hereinafter referred to as the intermittent range, the particular clutch selected in accordance with the direction of unbalance of the bridge circuit is continuously energized. Means have been provided in our circuit for determining the amount of unbalance of the bridge circuit 15 required to cause continuous energization of one of the clutches.

In order to understand the manner in which this operating characteristic of the amplifier and system is obtained, it is necessary first to consider the input potential-output current characteristic of the second amplification stage 81. This characteristic is completely described in detail in the co-pending application of Willis H. Gille, Serial No. 447,989, filed June 22, 1942, previously referred to. Therefore it will be mentioned but briefly in the present application. Referring to Figure 3, there is shown at A the normal input voltage-output current characteristic of the triode 96. Because of the high resistance (½ megohm) 101 connected in series with the control electrode 98, and because the input circuit is biased positively through resistance 102, tap 103, and resistances 104 and 113, the stage 81 as a whole does not have the same characteristic as the triode A. The positive biasing voltage causes a current to flow through resistance 101 and from the control electrode to the cathode in the triode 96. This current, flowing through resistance 101, produces thereacross a potential drop which effectively maintains the control electrode 98 at a value only slightly positive with respect to the cathode 99, whenever the resultant voltage impressed on the input circuit of the left terminal of resistance 101 is positive. Therefore, the stage 81 as a whole has an input voltage-output current characteristic which follows the curve A until a slightly positive value of input potential is reached, after which further increases in the input potential cause no change in the output current. The characteristic of the stage as a whole therefore follows the curve A when the input potential is negative or just slightly positive, and thereafter abruptly changes and follows the straight line B of Figure 3.

First consider the operation of the amplifier circuit including stage 81, as if the circuit controlled by the switch arms 122 and 118 were not present. Under such conditions, two potentials are applied to the input circuit of stage 81. One of these potentials is the biasing potential applied thereto through tap 103 and resistance 102. The other is the signal potential which is applied to the input circuit through the blocking condenser 124 and conductor 125. The biasing potential is determined by the division of the potential drop existing between positive supply terminal 94 and ground along the connection which includes resistances 113, 104, 105, a portion of resistance 108, conductor 109, and ground connection 110. The values of these resistances should be so chosen and related to the potential existing between supply line 94 and ground, and to the negative potential existing between ground and tap 107, that the potential of tap 103 is positive. The particular value of the potential at tap 103 is primarily adjusted by moving that tap along the resistance 104. The potential at tap 103 is also affected, however, by the setting of variable resistance 105, and by the position of tap 107 with respect to resistance 108. It will be readily understood that if either of these last two resistances are varied, the resistance between supply line 94 and ground along the voltage divider connection previously traced is changed, and the proportionality between the division of this voltage across the various resistances is also changed.

In considering the operation of this circuit, it may for convenience be assumed that the setting of tap 103 is such that the potential at the right hand terminal of resistance 102 has a positive value such as indicated at C in Figure 3. Let it be further assumed that an alternating signal potential of constant amplitude, as indicated at D in Figure 3, is impressed through blocking condenser 124 to the same point in the input circuit of the stage 81. Because of the positive bias potential C, only the negative peaks of the signal potential D are effective to cause variations in the output current of the stage 81. These variations in the output current are indicated by the curves E in Figure 3. These output current variations E cause equal and opposite variations in the potential of the anode 97, because of the change in the potential drop across load resistance 111. These potential variations are transmitted through the blocking condenser 148 to the input circuit of the final stage 82, where they cause corresponding variations in the current flow through one or the other of the triodes 131 and 132, depending on the phase of the signal. These current variations in the output circuit of the final stage may be represented by the curves F in Figure 4.

The relays controlled by the final stage 82 have an operating current differential, as is common in such devices. In other words, the current flow therethrough must exceed a predetermined value, which may be represented by the line G in Figure 4, before the relay moves its switch arms to their attracted positions; but after the switch arms have been moved to their attracted positions, the current flow through the relay winding must drop to a lower value, which may be indicated by the line H in Figure 4, before the switch arms move to their retracted positions.

When a current such as that represented by the curve F flows through one of the triodes of the final stage 82, the condenser in parallel with the relay associated with that triode is charged, and after the current pulse F has terminated, this charge flows through the relay winding, tending to maintain it energized. The current flow through the relay winding caused by the discharging current of the condenser may be represented by the curve K in Figure 4. Since the curves K of Figure 4 do not pass below the line H before the next current impulse F occurs, it may be seen that the relay is continuously energized when the current impulses reaching the relay have the magnitude indicated by the curve F. Therefore, if the circuits controlled by the switch arms 118 and 122 are disregarded, and an alternating signal of constant amplitude D is impressed on the amplifier circuit, the relay selected in accordance with the phase of the input signal is continuously energized.

The effect of the circuits controlled by the switch arms 118 and 122 may now be considered. As soon as one of the relays is energized, and moves its associated switch arms to their attracted position, a circuit is completed from the terminal 106 in the input circuit of stage 81 to ground at either 119 or 123. This connection shunts the left hand portion of resistance 108. The potential of terminal 106, which was previously somewhat negative with respect to ground due to the potential drop along resistance 108, is now suddenly changed to ground potential. When the terminal 106 assumes a potential more positive than that which it previously had, this change is reflected in all points along the voltage divider connection including resistances 113, 104, and 105. The change in the potential of points separated from terminal 106 by one or more resistance elements is delayed by the action of condenser 114, since a certain time is required for the flow of a charging current sufficient to change the charge on condenser 114 to correspond with the new conditions in the circuit. The potential at the tap 103 therefore gradually increases in a positive direction. The values of condenser 114 and the various resistances may be so chosen that the potential at the right hand terminal of resistance 102 changes along the curve indicated at L in Figure 3. The effect of the change in potential represented by the curve L in Figure 3 on the net input potential of the stage 81 is illustrated by the curve M in Figure 3, which represents the sum of the curves D and L.

It may be seen by reference to Figure 3, that the effect of the curve L is to reduce the magnitude of the negative peaks of the signal potential. During the second cycle of the signal D, the potential represented by the curve L has increased positively to an extent great enough so that it prevents any variation in the output current. The variations in the output current caused by the signal M are shown at N in Figure 3. These output current variations N cause corresponding output variations in the output current of the final stage 82, which are indicated by the curves P in Figure 4. The condensers connected in parallel with the relays cause the energization of the relays to hold over after the termination of the impulses P, the hold-over energization of the relays varying as indicated by the curves Q in Figure 4. It may therefore be seen that the relay selected is energized from the time when the curve P crosses the line G in an increasing direction, until the time when the curve Q crosses the line H in a decreasing direction. This time of energization of the relay is illustrated by the shaded area appearing above the curve in Figure 4. As soon as the relay is deenergized, the circuit connecting terminal 106 with ground is opened, and the input circuit of the stage 81 tends to resume its normal condition of potential distribution and depends for its length upon the value of P which in turn is dependent upon the magnitude of the signal potential received from the bridge. The establishment of this condition is delayed, however, by the time required for the charging current of condenser 114 to flow through the various resistances involved. The potential variation in the input circuit of stage 81 due to the opening of the shunt between terminal 106 and ground, and the resultant charging of condenser 114 may be represented by the curve R in Figure 3. As soon as the conditions in the input circuit of stage 81 have resumed their normal value, the cycle of energization and deenergization of the relay is repeated as before.

It may therefore be seen that the effect of the circuit controlled by the switch arms 118 and 122 is to cause intermittent energization of the relays at times when the signal applied to the input circuit of the stage 81 would otherwise cause continuous energization of the relay. It will be obvious that as the value of the signal potential received from the bridge 15 increases, the length of the "relay in" periods is similarly increased in length until the relay is continuously energized.

The positive biasing potential C determines the amplitude of the signal potential D necessary to cause energization of one of the relays. Therefore, the adjustment of the value of this positive biasing potential determines the width of the "dead spot" in the network 15. The "dead spot," or sensitivity of the system may therefore be adjusted by moving the tap 103 with respect to the resistance 104.

The adjustment of tap 107 along resistance 108 establishes the outer limit of the intermittent range of unbalance conditions of the bridge circuit 15. For example, it may be seen that movement of the tap 107 to the left along resistance 108 changes the amplitude of the potential change represented by the curves L and R in Figure 3. Movement of the tap 107 to the left for example, decreases the change in potential effected when the switches 118 or 122 are closed. This movement of tap 107 also, to a certain extent at least, changes the value of the potential existing at the tap 103, and thereby changes the magnitude of the biasing potential C. The amplitude of the curves L and R determines the value of the signal potential D at which the signal potential is effective to override the potentials L and R and cause continuous operation of the relay. It may therefore be stated that adjustment of tap 107 determines the outer limits of the intermittent range of unbalance of the bridge circuit 15.

Adjustment of resistance 105 varies the time constant of the charging and discharging circuit of condenser 114, and therefore varies the slope of the curves L and R in Figure 3. By adjusting the resistance 105, the frequency of the intermittent operations of the relay may be adjusted.

As the unbalance signal potential at the terminals of the bridge circuit increases from zero, intermittent operation of one of the relays is initiated as soon as the signal potential exceeds a first predetermined value, which is determined chiefly by the setting of tap 103 on resistance 104. When the signal potential decreases from a value greater than said first value, however, it has been found that the intermittent operation of the relay continues until the signal reaches another value lower than said first value. It is believed that there are two factors responsible for this effect. One of these factors is the charge on the condenser in parallel with the relay winding, which never quite dies down to zero between two successive current impulses. The second of two successive current impulses therefore starts with the condenser partially charged. A smaller proportion of the current impulse is then required to charge the condenser, and a greater proportion is available to energize the relay. Hence, a smaller current impulse is effective to cause energization of the relay if that impulse is preceded by one or more similar impulses, than is the case when the impulse in question must initiate relay operation after it has been deenergized for an appreciable time. The other factor which contributes to this effect is the residual magnetism in the relay core. Since the current flow through the relay winding is always of the same polarity, a residual flux exists after each current impulse, which flux, although small, exerts an attractive force on the relay armature, so that less force is required to be supplied by the next current impulse. This residual magnetism dies down as a function of time, so that it is effective to increase the sensitivity of the system only during a continued series of current impulses, and does not affect the operation of the relay by the first of the series. These two factors, the charge stored on the condenser in parallel with the relay winding and the residual magnetism in the relay core, cooperate, in effect, to increase the sensitivity of the system during the rebalancing phase of its operation over the sensitivity which exists at the time the system is first unbalanced.

This differential between the sensitivity of the system at the time of first unbalance and the sensitivity during rebalance aids materially in preventing the establishment of "hunting" conditions. When the system approaches a balanced condition, it may overshoot appreciably without causing a reversal of the unbalance signal potential sufficient to initiate energization of the opposite relay and start reverse movement of the driven load.

A somewhat different anti-hunting effect may be observed in this system when the sensitivity is adjusted substantially to its maximum, or, in other words, when the "dead spot" has been made very small. In such a case, if the system slowly approaches a balanced condition, the operation will be the same as that discussed immediately above. If the unbalance of the system is rapidly changing, however, so that the tendency of the system to overshoot is increased, then the system anticipates such an overshooting, and the relay which initiates operation of the rebalancing potentiometer in the reverse direction is energized before the limits of the "dead spot" is exceeded. The cause of this mode of operation is not positively known, but it is believed that the variations in potential at tap 103 which are caused by the operation of the switch arms 118 and 122 and by the condenser 114 are in turn the cause of a charging and discharging of the condenser 124 to accommodate the variations in the potential across it. The charging current of the condenser 124, flowing through resistance 95, is believed to have the effect of shifting the signal wave applied to the input stage 81 in a negative sense, so that a smaller signal is effective to cause energization of one of the relays. If the unbalance of the system changes so rapidly that the signal potential changes from one phase to the opposite before the potential represented by the curve R (Fig. 3) dies down, then the charging current for the condenser 124 has the effect of increasing the sensitivity of the system, so that the shaft 24 is reversed before it otherwise would be, thereby anticipating the reversal of the rebalancing potentiometer and effectively damping the tendency of the system to hunt.

*Figure 5*

There is shown in Figure 5 another embodiment of our invention, in which the input circuit of the stage 81 has been modified so that the width of the "dead spot" and the width of the intermittent range may be adjusted entirely independently of each other. The parts of this circuit which are the same as the corresponding parts in Figure 1 have been given the same reference characters, while circuit elements different from those in Figure 1 have been assigned reference characters in the 200 series. Generally speaking, the only parts of this circuit different from the corresponding parts of Figure 1 are the input circuit of the stage 81, and certain details of the rectifier circuit 83.

In the circuit of Figure 5, the resistances 101 and 102 in the input circuit of stage 81 are connected through a resistance 201. The lower terminal of resistance 201 is connected to ground at 202 through a resistance 203 and a parallel condenser 204. The lower terminal of resistance 201 is also connectable to the positive terminal of the rectifier circuit 83 through a connection which may be traced through conductor 205 and thence either through a conductor 206, a contact 207, and a switch arm 208 to a conductor 210, or through a conductor 211, a contact 212, and a switch arm 213 to conductor 210. From terminal 210 the connection is completed through a variable resistance 214 and a fixed resistance 215 to a conductor 216 associated with the positive output terminal of the rectifier circuit 83.

It may be stated that the potential at the lower terminal of resistance 201 in the input circuit of the stage 81 is determined by means of two voltage divider circuits. One of these voltage dividers is connected between conductor 94 and ground, and comprises the fixed resistance 113 and the resistance 104, along which the tap 103 is movable. This voltage divider circuit is always connected to the input circuit and is effective to determine the positive biasing potential C of Figure 3. The second voltage divider circuit may be traced from conductor 216 as its positive terminal through resistances 215 and 214, either switch arm 208 and contact 207 or switch arm 213 and contact 212, and thence through resistance 203 and condenser 204 to ground. Since this second circuit is normally open, it does not normally affect the biasing potential on the input circuit of stage 81. Therefore adjustment of the resistance 214 affects only the magnitude of the potential periodically applied to the input circuit of stage 81 when one of the switch arms 208 or 213 is closed, and does not disturb the magnitude of the biasing potential determined by the setting of tap 103. Therefore, in the circuit of Figure 5 adjustment of the dead spot of the system does not affect the adjustment of the intermittent range. Considering the "dead spot" and the intermittent range in the terms of distances along the resistance 13 and the control potentiometer 14, then it may be stated that in the circuit of Figure 5, that as the "dead spot" is increased in width, the width of the intermittent range does not change, but the entire range is merely shifted to the left or right. In the circuit of Figure 1, however, when the "dead spot" width is changed, a compensating change takes place in the width of the intermittent range, so that the outer limit of the intermittent range does not change when the "dead spot" is changed.

The rectifier circuit shown in Figure 5 includes a twin diode 220, which may be of the type commercially known as 7Y4. The twin diode 220 includes a first diode 221 having an anode 222, a cathode 223, and a heater filament 224. The second diode is generally indicated at 225, and includes an anode 226, a cathode 227, and a heater filament 228. The operation of this rectifier circuit is generally similar to that shown in Figure 1, except that this is a full wave rectifier, whereas that in Figure 1 is a half wave rectifier. Its output circuit may be traced from the conductor 216 which functions as a positive terminal, through a filter network which comprises a choke coil 230 and condensers 231 and 232 connected between the opposite terminals of the coil 230 and ground. After passing through the filter network, the output current of the rectifier circuit flows through a conductor 233 to conductor 94, which acts as the positive terminal for the output circuits of stages 80 and 81. The current supplied by the rectifier circuit passes through the various output circuits and the ground connections therein to the ground connection 234, and thence through a resistance 235 and a conductor 236 to a center tap on transformer winding 155. A filter condenser 240 is connected between conductor 236 and terminal 213.

A tap 238 associated with resistance 235 is connected through a conductor 237 to the conductor 142 in the common input circuit of the final amplifying stage 82. Adjustment of the tap 238 along resistance 235 determines the negative biasing potential applied to the input circuit of final stage 82.

The various heater filaments may be connected to any suitable source of electrical energy (not shown).

The following table gives values of the various resistances and condensers in Figure 5 which have been used in one embodiment of that circuit:

| Reference Character | Quantity |
| --- | --- |
| 90 | 10,000 ohms. |
| 95 | ¼ megohm. |
| 101 | ½ megohm. |
| 102 | 1 megohm. |
| 104 | 1 megohm. |
| 111 | ¼ megohm. |
| 113 | ¼ megohm. |
| 124 | .05 microfarad. |
| 148 | .05 microfarad. |
| 157, 163 | 1 microfarad. |
| 201 | ½ megohm. |
| 203 | 0.1 megohm. |
| 204 | .05 microfarad. |
| 214 | 0.5 megohm. |
| 215 | 0.1 megohm. |
| 230 | 4,000 ohms D. C. resistance, 30 henries inductance. |
| 231 | ½ microfarad. |
| 232 | .05 microfarad. |
| 235 | .05 megohm. |
| 240 | .05 microfarad. |

*Figures 6 and 7*

In Figure 6 is shown a modification of the circuit of Figure 1 which may be used in case a somewhat shorter time is desired between the successive intermittent energizations of the relays. In this circuit, the variable resistance 105 of Figure 1 has been replaced by a fixed resistance 192. The condenser 114 of Figure 1 has been replaced by a condenser 191 connected directly between the terminal 106 and ground. The potentiometer resistance 108 of Figure 1 has been replaced by a rheostat type of variable resistance 190.

The general effect of this type of circuit is shown in Figure 7, wherein a curve S represents the curve corresponding to the curve L, R of Figure 3. It may be seen that the curve S corresponds generally to the form of the curve R of Figure 3, but that the portion of the curve represented by L in Figure 3 is replaced in Figure 7 by a straight line. This is due to the fact that when either the switch arms 118 and 122 of Figure 6 engages its associated contact, the condenser 191 is suddenly shunted, and discharges quickly through a dead short circuit, permitting a sudden change in the potential of terminal 106. This quickly overcomes the signal potential and deenergizes the relay after only a short period of energization. When the relay is deenergized, the shunt around the condenser 191 is opened, and the condenser charges slowly, depending upon the time constant of the circuit including the condenser and the resistances in series with it through which it is charged.

The following table gives values of the various resistances and condensers which have been used in one embodiment of the circuit of Figure 6:

| Reference Character | Quantity |
| --- | --- |
| 101 | ½ megohm. |
| 102 | 1 megohm. |
| 104 | ¼ megohm. |
| 111 | ¼ megohm. |
| 113 | 1 megohm. |
| 124 | .05 microfarad. |
| 147 | .05 megohm. |
| 148 | .05 microfarad. |
| 185 | ¼ megohm. |
| 187 | 12 microfarads. |
| 188 | .05 microfarad. |
| 190 | 0.1 megohm. |
| 191 | ½ microfarad. |

While we have shown and described certain preferred embodiments of our invention, other modifications will occur to those skilled in the art, and therefore we wish our invention to be limited only by the appended claims.

We claim as our invention:

1. Control apparatus, comprising in combination, means for producing an electrical signal potential, a relay, amplifier means normally responsive to said potential for energizing said relay in accordance therewith, and means including a circuit controlled by said relay for rendering said amplifier means unresponsive to said potential when said relay is energized, thereby causing intermittent operation of said relay.

2. Control apparatus, comprising in combination, means for producing an alternating electrical signal potential, relay means including an electrical winding, amplifier means having an input circuit and an output circuit and an input potential-output current characteristic including a first portion wherein the output current varies substantially as a linear function of said input potential and a second portion immediately adjacent said first portion wherein the output current is substantially constant, means associated with said input circuit for impressing thereon a unidirectional biasing potential effective to cause said amplifier means to operate normally on said second portion of said characteristic, means for impressing said signal potential on said input circuit, said signal potential being effective when its amplitude is in excess of a value determined by the magnitude of said biasing potential to cause operation of said amplifier means on said first portion of said characteristic, means responsive to variation of the output current of said amplifier means for energizing said relay winding, and means responsive to energization of said relay winding for impressing on said input circuit an additional unidirectional potential tending to restore said amplifier means to operation on said second characteristic portion, and thereby to cause intermittent energization of said winding.

3. Control apparatus, comprising in combination, means for producing an alternating electrical signal potential, relay means including an electrical winding, amplifier means having an input circuit and an output circuit and an input potential-output current characteristic including a first portion wherein the output current varies substantially as a linear function of said input potential and a second portion immediately adjacent said first portion wherein the output current is substantially constant, means associated with said input circuit for impressing thereon a positive biasing potential effective to cause said amplifier means to operate normally on said second portion of said characteristic, means for impressing said signal potential on said input circuit, said signal potential being effective when its amplitude is in excess of a value determined by the magnitude of said biasing potential to cause operation of said amplifier means on said first portion of said characteristic, means responsive to variation of the output current of said amplifier means for energizing said relay winding, a source of negative potential normally connected to said input circuit, and means responsive to energization of said relay winding for effectively disconnecting said source from said input circuit, so as to render said biasing potential more positive and to restore said amplifier means to operation on said second characteristic portion, thereby causing intermittent energization of said winding.

4. Control apparatus, comprising in combination, means for producing an alternating electrical signal potential, relay means including an electrical winding and contacts controlled thereby, amplifier means having an input circuit and an output circuit and an input potential-output current characteristic including a first portion wherein the output current varies substantially as a linear function of said input potential and a second portion immediately adjacent said first portion wherein the output current is substantially constant, means associated with said input circuit for impressing thereon a positive biasing potential effective to cause said amplifier means to operate normally on said second portion of said characteristic means for impressing said signal potential on said input circuit, said signal potential being effective when its amplitude is in excess of a value determined by the magnitude of said biasing potential to cause intermittent operation of said amplifier means on said first portion of said characteristic, means responsive to variation of the output current of said amplifier means for energizing said relay winding, and means including a circuit controlled by said contacts for impressing on said input circuit an additional positive potential tending to restore said amplifier means to operation on said second characteristic portion, and thereby to cause intermittent energization of said winding.

5. Control apparatus, comprising in combination, means for producing an alternating electrical signal potential, relay means including an electrical winding, amplifier means including an electric discharge device having an anode, a cathode and a control electrode, an input circuit including said control electrode and cathode, and an output circuit including said anode and cathode, said amplifier means having an input potential-output current characteristic including a first portion wherein the output current varies substantially as a linear function of said input potential and a second portion immediately adjacent said first portion wherein the output current is substantially constant, two sources of unidirectional electrical potential, means connecting the positive and negative terminals of one of said sources to said anode and cathode, respectively, a voltage divider connected across both said sources in series, a connection between a tap on said divider and said input circuit to impress on said input circuit a positive biasing potential effective to cause said amplifier means to operate normally on said second portion of said characteristic, means for impressing said signal potential on said input circuit, said signal potential being effective when its amplitude is in excess of a value determined by the magnitude of said biasing potential to cause operation of said amplifier means on said first portion of said characteristic, means responsive to variation of the output current of said amplifier means for energizing said relay winding, and means responsive to energization of said relay winding for substantially shunting the other of said sources so as to cause the biasing potential impressed on said input circuit to increase in a positive direction, thereby tending to restore said amplifier means to operation on said second characteristic portion and to cause intermittent energization of said winding.

6. Control apparatus, comprising in combination, means for producing an alternating electrical signal potential, relay means including an electrical winding, amplifier means including an electrical discharge device having an anode, a cathode, and a control electrode, an input circuit including said control electrode and cathode, and an output circuit including said anode and cathode, said amplifier means having an input potential-output current characteristic including a first portion wherein the output current varies substantially as a linear function of said input potential and a second portion immediately adjacent said first portion wherein the output current is substantially constant, a source of unidirectional electrical potential, means connecting the positive and negative terminals of said source to said anode and cathode, respectively, a voltage divider connected across said source, a connection between a tap on said divider and said input circuit to impress on said input circuit a positive biasing potential effective to cause said amplifier means to operate normally on said second portion of said characteristic, means for impressing said signal potential on said input circuit, said signal potential being effective when its amplitude is in excess of a value determined by the magnitude of said biasing potential to cause operation of said amplifier means on said first portion of said characteristic, means responsive to variation of the output current of said amplifier means for energizing said relay winding, and means responsive to energization of said relay winding for establishing a second connection between the positive terminal of said source and said input circuit to impress thereon an additional positive potential tending to restore said amplifier means to operation on said second characteristic portion, and thereby to cause intermittent energization of said winding.

7. Electrical control apparatus, comprising in combination, a device to be controlled, means responsive to a condition indicative of the need for operation of said device for producing an alternating electrical signal potential, relay means including an electrical winding and a plurality of switch means operated in accordance with the energization of said winding, amplifier means having an input circuit and an output circuit, said amplifier means being responsive to said signal potential and effective when the amplitude of said signal potential exceeds a minimum value to produce a variation of the current in said output circuit corresponding to the excess of said signal potential over said minimum value, means responsive to variation of said output current for causing energization of said relay winding, means including an electrical circuit controlled by certain of said switch means and effective upon energization of said relay winding to impress on said input circuit a unidirectional potential of a polarity such as to increase said minimum value, and thereby to cause intermittent energization of said relay, and an electrical circuit controlled by another of said switch means and including said device.

8. Control apparatus, comprising in combination, means for producing an alternating electrical signal potential, relay means including an electrical winding, amplifier means having an input circuit and an output circuit, said amplifier means being responsive to said signal potential and effective when the amplitude of said signal potential exceeds a minimum value to produce a variation of the current in said output circuit corresponding to the excess of said signal potential over said minimum value, means responsive to variation of said output current for causing energization of said relay winding, and means responsive to energization of said relay winding for impressing on said input circuit a unidirectional potential of a polarity such as to increase said minimum value, thereby causing intermittent energization of said relay when said signal potential lies within a range of values determined by said unidirectional potential, and means for adjusting said unidirectional potential so as to determine said range of values.

9. Control apparatus, comprising in combination, means for producing an alternating electrical signal potential, relay means including an electrical winding, amplifier means including an electrical discharge device having an anode, a cathode, and a control electrode, an input circuit including said control electrode and cathode, and an output circuit including said anode and cathode, said amplifier means having an input potential-output current characteristic including a first portion wherein the output current varies substantially as a linear function of said input potential and a second portion immediately adjacent said first portion wherein the output current is substantially constant, a source of unidirectional electrical potential, means connecting the positive and negative terminals of said source to said anode and cathode, respectively, a voltage divider connected across said source, a connection between a tap on said divider and said input circuit to impress thereon a positive biasing potential effective to cause said amplifier means to operate normally on said second portion of said characteristic, means for impressing said signal potential on said input circuit, said signal potential being effective when its amplitude is in excess of a minimum value determined by the magnitude of said biasing potential to cause operation of said amplifier means on said first portion of said characteristic, means for adjusting said tap so as to change said minimum value, means responsive to variation of the output current of said amplifier means for energizing said relay winding, means responsive to energization of said relay winding for establishing a second connection between the positive terminal of said source and said input circuit to impress thereon an additional positive potential tending to restore said amplifier means to operation on said second characteristic portion, and thereby to cause intermittent energization of said winding, and variable impedance means in said second connection for varying said additional potential so as to determine the range of values of said signal wherein said second connection is effective to cause intermittent energization of said winding.

10. Control apparatus, comprising in combination, means for producing an alternating electrical signal potential, relay means including an electrical winding, amplifier means having an input circuit and an output circuit, said amplifier means being responsive to said signal potential and effective when the amplitude of said signal potential exceeds a minimum value to produce a variation of the current in said output circuit corresponding to the excess of said signal potential over said minimum value, means responsive to variation of said output current for causing energization of said relay winding, means responsive to energization of said relay winding for impressing on said input circuit a unidirectional potential of a polarity such as to increase said minimum value, thereby causing intermittent energization of said relay, and means including a condenser for controlling the rate of variation of said unidirectional potential.

11. Control apparatus, comprising in combination, means for producing an alternating electrical signal potential, relay means including an electrical winding, amplifier means having an input circuit and an output circuit, said amplifier means being responsive to said signal potential and effective when the amplitude of said signal potential exceeds a minimum value to produce a variation of the current in said output circuit corresponding to the excess of said signal potential over said minimum value, means responsive to variation of said output current for causing energization of said relay winding, and means responsive to energization of said relay winding for impressing on said input circuit a unidirectional potential of a polarity such as to increase said minimum value, thereby causing intermittent energization of said relay, said last-named means including condenser means for delaying the rate of application of said unidirectional potential to said input circuit.

12. Control apparatus, comprising in combination, means for producing an alternating electrical signal potential, relay means including an electrical winding and contacts operated thereby to closed position upon energization of said winding, amplifier means having an input circuit and an output circuit, said amplifier means being responsive to said signal potential and effective when the amplitude of said signal potential exceeds a minimum value to produce a variation of the current in said output circuit corresponding to the excess of said signal potential over said minimum value, means responsive to variation of said output current for causing energization of said relay winding, and means responsive to energization of said relay winding for impressing on said input circuit a unidirectional potential of a polarity such as to increase said minimum value, thereby causing intermittent energization of said relay, said last-named means including a condenser shunted upon closure of said contacts but effective upon opening of said contacts to delay restoration of the potential conditions in said input circuit to their normal state.

13. Electrical control apparatus, comprising in combination, a device to be positioned, driving means for said device, a pair of relays for selectively controlling the operation of said driving means for rotation of said device in opposite directions, a source of alternating electrical energy, a normally balanced electrical network connected to said source and including a pair of output terminals having a potential difference of magnitude and phase dependent upon the magnitude and direction of unbalance of said network, means responsive to a condition indicative of the need for operation of said device for unbalancing said network, means driven by said driving means for rebalancing said network, means including an electronic amplifier for coupling said output terminals and said relays to selectively energize said relays in accordance with the direction of unbalance of said network, means for varying the sensitivity of said amplifier to said potential difference, and means connecting said relays and said last mentioned means to affect the operation thereof, in such a fashion as to reduce the sensitivity of said amplifier, when either of said relays is energized, thereby causing intermittent operation of the selected relay when the magnitude of said potential difference lies within a predetermined range of values.

14. Electrical control apparatus, comprising in combination, a device to be positioned, driving means for said device, a pair of relays for selectively controlling the operation of said driving means for rotation of said device in opposite directions, a source of alternating electrical energy, a normally balanced electrical network connected to said source and including a pair of output terminals have a potential difference of magnitude and phase dependent upon the magnitude and direction of unbalance of said network, means responsive to a condition indicative of the need for operation of said device for unbalancing said network, means driven by said driving means for rebalancing said network, means including an electronic amplifier for coupling said output terminals and said relays to selectively energize said relays in accordance with the direction of unbalance of said network, circuit means controlled by said relays for reducing the sensitivity of said amplifier to said potential difference when either of said relays is energized, said amplifier and circuit means cooperating upon an increase in said potential difference to cause intermittent operation of the selected relay as soon as said potential difference exceeds a first predetermined value and upon a decrease in said potential difference from a value greater than said first value to continue intermittent operation of the selected relay until said amplitude becomes less than a second value smaller than said first value, and means effective upon a rapid change in said potential difference occurring as an incident to a rapid reversal in the direction of unbalance of said network to cause intermittent operation of the selected relay as soon as said potential difference exceeds said second value, thereby anticipating further unbalance of said network.

15. Control apparatus which includes: a relay having a pair of contacts closed upon energization thereof; an amplifier responsive to an electric signal potential and having an input potential-output current characteristic including a first portion wherein the output current varies substantially as a linear function of said input potential, and a second portion wherein the output current is substantially constant, said amplifier normally operating on said second portion of said characteristic, but operating on said first portion of said characteristic when said signal potential exceeds a predetermined value, said relay being connected to said amplifier and energized when said amplifier is operated on said first portion of said characteristic; and means connected to said amplifier and operated by the closure of said contacts to shift the operation of said amplifier from said first portion toward the second portion of said characteristic.

16. Control apparatus comprising in combination: a relay; an electronic amplifier responsive to an alternating signal potential of variable amplitude; means including said amplifier and effective when said signal amplitude exceeds a first predetermined value to cause intermittent operation of said relay, and when said signal amplitude exceeds a second predetermined value to cause continuous operation of said relay; and means for adjusting said first means to vary said first predetermined value without affecting said second predetermined value.

17. Control apparatus comprising in combination: a relay; an electronic amplifier responsive to an alternating signal potential of variable amplitude; means including said amplifier and effective when said signal amplitude exceeds a first predetermined value to cause intermittent operation of said relay, and when said signal amplitude exceeds a second predetermined value to cause continuous operation of said relay; and means for adjusting said first means to vary either of said predetermined values without affecting the other of said values.

18. Control apparatus comprising in combination: a relay; an electronic amplifier responsive to an alternating signal potential of variable amplitude; means including said amplifier and effective upon an increase in the amplitude of said signal potential to cause intermittent operation of said relay as soon as said amplitude exceeds a first predetermined value; and means connected to said first means and effective upon a decrease in said amplitude from a value greater than said first value to continue intermittent operation of said relay until said amplitude becomes less than a second value smaller than said first value.

19. Control apparatus comprising in combination: a relay; an electronic amplifier responsive to an alternating signal potential of variable magnitude; means including said amplifier and effective upon an increase in the amplitude of said signal potential to cause intermittent operation of said relay as soon as said amplitude exceeds a first predetermined value; means connected to said first means and effective upon a decrease in said amplitude from a value greater than said first value to continue intermittent operation of said relay until said amplitude becomes less than a second value smaller than said first value; and means for adjusting said last means to vary simultaneously said first and second values.

20. Control apparatus, comprising in combination, a relay, amplifier means normally responsive to an electrical signal potential for energizing said relay in accordance therewith, and means controlled by said relay for reducing the sensitivity of said amplifier to said potential when said relay is effectively energized to such an extent that when said signal lies within a predetermined range of values said relay is effectively deenergized, thereby causing intermittent operation of said relay when said signal lies within said predetermined range of values.

21. Electrical control apparatus, comprising in combination, a device to be positioned, driving means for said device, a pair of relays for selectively controlling the operation of said driving means for rotation of said device in opposite directions, a source of alternating electrical energy, a normally balanced electrical network connected to said source and including a pair of output terminals having a potential difference of magnitude and phase dependent upon the magnitude and direction of unbalance of said network, means responsive to a condition indicative of the need for operation of said device for unbalancing said network, means driven by said driving means for rebalancing said network, electronic amplifier means for coupling said output terminals and said relays to selectively energize said relays in accordance with the direction of unbalance of said network, and means associated with said amplifier means for causing intermittent energization of the selected relay for periods of time which vary substantially as a linear function of the magnitude of said potential difference.

22. Electrical control apparatus, comprising in combination, a device to be positioned, driving means for said device, a pair of relays for selectively controlling the operation of said driving means for rotation of said device in opposite directions, a source of alternating electrical energy, a normally balanced electrical network connected to said source and including a pair of output terminals having a potential difference of magnitude and phase dependent upon the magnitude and direction of unbalance of said network, means responsive to a condition indicative of the need for operation of said device for unbalancing said network, means driven by said driving means for rebalancing said network, electronic amplifier means for coupling said output terminals and said relays to selectively energize said relays in accordance with the direction of unbalance of said network, and means associated with said amplifier means for causing intermittent energization of the selected relay for periods of time which vary substantially as a linear function of the magnitude of said potential difference when said potential difference lies within a predetermined range of values, and for causing continuous operation of the selected relay when said potential difference exceeds said range of values.

23. Control apparatus comprising in combination: relay means including an electrical winding and control means operated thereby upon energization thereof; electronic amplifier means responsive to an alternating electrical signal potential of variable magnitude and controlling the current flow to said winding; and means associated with said amplifier to vary the sensitivity thereof to variably interrupt the energization of said control means in such a manner that the total operating time of said control means varies directly as the magnitude of said signal.

24. Control apparatus comprising in combination: relay means including an electrical winding and control means operated thereby upon energization thereof; electronic amplifier means responsive to an alternating electrical signal potential of variable magnitude and controlling the energization of said winding; and means associated with said amplifier means and operated by said control means to variably interrupt the energization of said control means in such a manner that the total operating time of said control means varies directly as the magnitude of such signal when said signal lies within a predetermined range of values, and to cause continuous operation of said control means when said signal exceeds said range of values.

25. Control apparatus comprising in combination: relay means including an electrical winding and control means operated thereby upon energization thereof; electronic amplifier means responsive to an alternating electrical signal potential of variable magnitude and controlling the current flow to said winding; means associated with said amplifier means and operated by said control means to variably interrupt the operation of said control means in such a manner that the total operating time of said control means varies directly as the magnitude of said signal; and means connected to said amplifier for establishing the minimum value of said signal which causes operation of said control means.

26. Control apparatus comprising in combination: relay means including an electrical winding and control means operated thereby upon energization thereof; electronic amplifier means responsive to an alternating electrical signal potential of variable magnitude and controlling the current flow to said winding; means connected to said amplifier means and operated by said control means to variably interrupt the operation of said control means in such a manner that the total operating time of said control means varies directly as the magnitude of said signal when said signal lies within a predetermined range of values, and to cause continuous operation of said control means when said signal exceeds said range of values; and means connected to said amplifier for establishing the value of said signal at which operation of said control means becomes continuous.

27. Control apparatus comprising in combination: relay means including an electrical winding and control means and operated thereby upon energization thereof; electronic amplifier means responsive to an alternating electrical signal potential of variable magnitude and controlling the current flow to said winding; means associated with said amplifier means operated by said control means to variably interrupt the operation of said control means in such a manner that the total operating time of said control means varies directly as the magnitude of said signal when said signal lies within a predetermined range of values and to cause a continuous operation of said control means when said signal exceeds said range of values; means connected to said amplifier for establishing the minimum value of said signal which causes operation of said control means; and further means connected to said amplifier for establishing the value of said signal at which operation of said control means becomes continuous.

WILLIS H. GILLE.
WILLIAM J. FIELD.
ALBERT P. UPTON.

REFERENCES CITED

The following references are of record in the file of this patent:

UNITED STATES PATENTS

| Number | Name | Date |
|---|---|---|
| 2,256,304 | Wills | Sept. 16, 1941 |
| 1,742,235 | Cooley | Jan. 7, 1930 |
| 2,109,222 | Ryder | Feb. 22, 1938 |
| 2,267,682 | Fairchild, et al. | Dec. 23, 1941 |
| 2,040,014 | Moseley | May 5, 1936 |

FOREIGN PATENTS

| Number | Country | Date |
|---|---|---|
| 320,705 | Great Britain | Oct. 24, 1929 |